United States Patent
Stevens et al.

(10) Patent No.: US 8,357,748 B2
(45) Date of Patent: Jan. 22, 2013

(54) PEROXIDE CURABLE FLUOROELASTOMER COMPOSITIONS AND ARTICLES MADE THEREFROM

(75) Inventors: Ronald D. Stevens, Norton, OH (US); Shuhong Wang, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/116,148

(22) Filed: May 26, 2011

(65) Prior Publication Data

US 2011/0224358 A1    Sep. 15, 2011

Related U.S. Application Data

(63) Continuation of application No. 12/392,388, filed on Feb. 25, 2009, now abandoned.

(60) Provisional application No. 61/068,128, filed on Mar. 4, 2009.

(51) Int. Cl.
| | |
|---|---|
| C08K 3/16 | (2006.01) |
| C08L 27/00 | (2006.01) |
| C08L 27/14 | (2006.01) |
| C08L 27/16 | (2006.01) |

(52) U.S. Cl. ........ 524/520; 525/191; 525/193; 525/199; 525/200; 526/247

(58) Field of Classification Search .................. 524/520; 525/193, 199, 200, 191; 526/247
See application file for complete search history.

(56) References Cited

U.S. PATENT DOCUMENTS

| | | | |
|---|---|---|---|
| 4,115,481 A | 9/1978 | Finlay | |
| 4,694,045 A | 9/1987 | Moore | |
| 4,708,988 A * | 11/1987 | Tabb | ............................ 525/194 |
| 5,151,492 A | 9/1992 | Abe | |
| 5,674,959 A | 10/1997 | Arcella et al. | |
| 5,717,036 A | 2/1998 | Saito et al. | |
| 6,737,479 B2 | 5/2004 | Faulkner | |
| 2004/0092684 A1* | 5/2004 | Lyons | ........................... 526/206 |

FOREIGN PATENT DOCUMENTS

| | | |
|---|---|---|
| EP | 0207477 A | 1/1987 |
| EP | 1798252 A1 | 6/2007 |
| WO | 9722636 A2 | 6/1997 |

OTHER PUBLICATIONS

International Search Report, European Patent Office, Rijswijk NL in PCT/2009/035993, PCT Counterpart of present U.S. Appl. No. 13/116,148, Enrique de Los Arcos, Authorized Officer, Mar. 6, 2009.

* cited by examiner

*Primary Examiner* — James J Seideck
*Assistant Examiner* — Deve E Valdez

(57) ABSTRACT

Peroxide curable fluoroelastomer compositions and articles made therefrom are disclosed. The compositions contain 5 to 45 weight percent, based on total weight of all fluoroelastomers present in the composition, of a blend of dynamically cured fluoroelastomer particles in an uncured fluoroelastomer. The compositions are unfilled, but have tensile properties adequate for many end use applications and are particularly useful as seals in semiconductor manufacturing equipment.

9 Claims, No Drawings

PEROXIDE CURABLE FLUOROELASTOMER COMPOSITIONS AND ARTICLES MADE THEREFROM

CROSS-REFERENCE TO RELATED APPLICATIONS

This application is a continuation of U.S. application Ser. No. 12/392,388, filed Feb. 25, 2009 which claims the benefit of U.S. Provisional Application No. 61/068,128 filed Mar. 4, 2008.

FIELD OF THE INVENTION

This invention relates to peroxide curable fluoroelastomer compositions that are substantially free of filler and to cured articles made therefrom wherein said fluoroelastomer compositions contain a peroxide curable fluoroelastomer and an amount of gelled fluoroelastomer.

BACKGROUND OF THE INVENTION

Fluoroelastomers having excellent heat resistance, oil resistance, and chemical resistance have been used widely for sealing materials, containers and hoses. Examples of fluoroelastomers include copolymers comprising units of vinylidene fluoride ($VF_2$) and units of at least one other copolymerizable fluorine-containing monomer such as hexafluoropropylene (HFP), tetrafluoroethylene (TFE), chlorotrifluoroethylene (CTFE), vinyl fluoride (VF), and a fluorovinyl ether such as a perfluoro(alkyl vinyl ether) (PAVE). Specific examples of PAVE include perfluoro(methyl vinyl ether), perfluoro(ethyl vinyl ether) and perfluoro(propyl vinyl ether).

In order to develop the physical properties necessary for most end use applications, fluoroelastomers must be crosslinked (i.e. cured). A preferred curing system for many end uses is the combination of an organic peroxide and a multifunctional unsaturated coagent. The coagent forms crosslinks by reacting with bromine or iodine atom cure sites on the fluoroelastomer polymer chain. A preferred cure site is an iodine atom bonded to a carbon atom on the fluoroelastomer chain.

Typical peroxide curable fluoroelastomer compositions also contain fillers such as carbon black, $SiO_2$, $TiO_2$, $BaSO_4$, $Al_2O_3$, etc. Fillers generally improve the tensile properties of the cured fluoroelastomer. In the case of peroxide curable fluoroelastomer compositions, fillers also improve the processability of the compositions on rubber manufacturing equipment such as mills and extruders where slippage may occur in the absence of filler, and in compression molding where mold fouling can occur without filler present in the compositions. However, fillers may also be an undesirable source of contamination by metals or particles in some end use applications such as in semiconductor manufacturing equipment where elastomer articles contact harsh environments such as plasmas.

Unfilled peroxide curable fluoroelastomer compositions are known in the art, but they are typically difficult to manufacture and have low tensile properties, making them unsuitable for some end use applications.

Curable compositions of fluoroelastomers that contain particles of dynamically cured fluoroelastomer particles (also referred to as gel) and filler have been previously disclosed, e.g. U.S. Pat. No. 4,708,988. The presence of gel appears to decrease the tensile strength of the peroxide cured compositions.

SUMMARY OF THE INVENTION

The present invention provides an unfilled curable fluoroelastomer composition and cured article made therefrom that has adequate tensile strength for many end use applications, reduced metal content and that results in reduced particles when exposed to reactive plasma.

Accordingly, one aspect of the present invention is a curable fluoroelastomer composition comprising:

A) 55 to 95 weight percent, based on total weight of all fluoroelastomers in said composition, of a first curable fluoroelastomer comprising copolymerized units of i) vinylidene fluoride and ii) at least one other fluoromonomer, said first fluoroelastomer having cure sites selected from the group consisting of iodine atoms, bromine atoms, and the combination of iodine and bromine atoms;

B) 5 to 45 weight percent, based on total weight of all fluoroelastomers in said composition, of a blend comprising i) 55 to 95 weight percent, based on total weight of said blend, of cured particles of a second fluoroelastomer comprising copolymerized units of a) vinylidene fluoride and b) at least one other fluoromonomer, said second fluoroelastomer having cure sites selected from the group consisting of iodine atoms, bromine atoms, and the combination of iodine and bromine atoms; and ii) 5 to 45 weight percent, based on total weight of said blend, of an uncured third fluoroelastomer comprising copolymerized units of a) vinylidene fluoride and b) at least one other fluoromonomer, said third fluoroelastomer having no bromine or iodine cure sites;

C) less than 1 weight percent, based on total weight of said curable composition, of filler;

D) 0.1 to 6 parts by weight organic peroxide per hundred parts by weight of said first curable fluoroelastomer; and E) 0.1 to 10 parts by weight multifunctional unsaturated coagent per hundred parts by weight of said first curable fluoroelastomer.

Another aspect of the present invention is a cured article prepared from the above described curable fluoroelastomer composition.

DETAILED DESCRIPTION OF THE INVENTION

The present invention is directed to unfilled peroxide curable fluoroelastomer compositions and to cured articles prepared therefrom. By "unfilled" is meant that the composition contains less than 1 (preferably less than 0.5, most preferably 0) weight percent filler based on the total weight of the curable fluoroelastomer composition. By "filler" is meant any filler commonly employed in the rubber industry such as carbon black, silica, titanium dioxide, alumina, barium sulfate, silicates of magnesium, calcium or aluminum, calcium carbonate, PTFE micropowders, etc. In some end use applications, such as semiconductor manufacturing environments where the cured articles are exposed to reactive plasma, the unfilled cured articles of the invention release less contamination (e.g. metals and particles) than do filled cured articles of similar composition. By "reactive plasma" is meant plasma that reacts with fluoroelastomer; such plasmas include, $O_2$, $CF_4$, $NF_3$, etc.

Preferably the curable compositions and cured articles of the invention are substantially free of metal oxides and hydroxides (e.g. MgO, $Ca(OH)_2$, PbO, ZnO, etc.) which, when present, can also be an undesirable source of metal contamination in some end use environments. By "substantially free" is meant less than 1 (preferably less than 0.5, most preferably 0) weight percent metal oxide or metal hydroxide based on the total weight of the fluoroelastomer composition.

A curable composition of the invention comprises A) 55 to 95 weight percent, based on the total weight of all fluoroelastomers present in the composition, of a curable first fluoroelastomer. In order to improve processability (e.g. mixing and extrusion) of the curable compositions of the invention and to improve the tensile strength of cured articles made therefrom, the curable composition of the invention further comprises B) 5 to 45 (preferably 20 to 30) weight percent, based on total weight of all the fluoroelastomers present in the composition, of a blend of i) 55 to 95 weight percent, based on total weight of said blend, of dynamically cured particles (i.e. gel) of a second fluoroelastomer dispersed in ii) 5 to 45 weight percent, based on total weight of the blend, of an uncured third fluoroelastomer. The first and second fluoroelastomers are curable by organic peroxide (i.e. they contain bromine, iodine or both bromine and iodine cure sites). The first and second fluoroelastomers may be the same or of different composition. The third fluoroelastomer does not contain such cure sites and is not curable by peroxide.

The blend of dynamically cured second fluoroelastomer particles dispersed in an uncured third fluoroelastomer is made by introducing uncured second fluoroelastomer, third fluoroelastomer, 1 to 5 phr organic peroxide and 1.5 to 10 multifunctional unsaturated coagent into an internal mixer or an extruder at a temperature above the decomposition temperature of the peroxide. The second fluoroelastomer is then dynamically cured in the mixer to form gel particles dispersed in the third uncured elastomer.

Curable compositions of the invention further comprise 0.1 to 6 (preferably 1.5 to 3) parts by weight organic peroxide per hundred parts by weight of said curable first fluoroelastomer, and 0.1 to 10 (preferably 1.5 to 3) parts by weight multifunctional unsaturated coagent per hundred parts by weight of said curable first fluoroelastomer.

The fluoroelastomers employed in this invention comprise copolymerized units of vinylidene fluoride ($VF_2$) and one or more additional fluoromonomers (not $VF_2$) such as those selected from the group consisting of fluorine-containing olefins, fluorine-containing ethers and mixtures thereof.

According to the present invention, fluorine-containing olefins copolymerizable with vinylidene fluoride include, but are not limited to hexafluoropropylene (HFP), tetrafluoroethylene (TFE), 1,2,3,3,3-pentafluoropropene (1-HPFP), chlorotrifluoroethylene (CTFE) and vinyl fluoride.

Fluorine-containing ethers that may be employed in the fluoroelastomers include, but are not limited to perfluoro(alkyl vinyl ethers), perfluoro(alkyl alkenyl ethers) and perfluoro(alkoxy alkenylethers).

Perfluoro(alkyl vinyl ethers) (PAVE) suitable for use as monomers include those of the formula $$CF_2=CFO(R_fO)_n(R_{f'}O)_mR_f \qquad (I)$$

where $R_f$ and $R_{f'}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl ethers) includes compositions of the formula $$CF_2=CFO(CF_2CFXO)_nR_f \qquad (II)$$

where X is F or $CF_3$, n is 0-5, and $R_f$ is a perfluoroalkyl group of 1-6 carbon atoms. A most preferred class of perfluoro(alkyl vinyl ethers) includes those ethers wherein n is 0 or 1 and $R_f$ contains 1-3 carbon atoms. Examples of such perfluorinated ethers include perfluoro(methyl vinyl ether) (PMVE) and perfluoro(propyl vinyl ether) (PPVE). Other useful monomers include compounds of the formula $$CF_2=CFO[(CF_2)_mCF_2CFZO]_nR_f \qquad (III)$$

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl ether) monomers include compounds of the formula $$CF_2=CFO[(CF_2CF\{CF_3\}O)_n(CF_2CF_2CF_2O)_m(CF_2)_p]C_xF_{2x+1} \qquad (IV)$$

where m and n independently=0-10, p=0-3, and x=1-5. Preferred members of this class include compounds where n=0-1, m=0-1, and x=1.

Other examples of useful perfluoro(alkyl vinyl ethers) include $$CF_2=CFOCF_2CF(CF_3)O(CF_2O)_mC_nF_{2n+1} \qquad (V)$$

where n=1-5, m=1-3, and where, preferably, n=1.

Perfluoro(alkyl alkenyl ethers) suitable for use as monomers include those of the formula VI $$R_fO(CF_2)_nCF=CF_2 \qquad (VI)$$

where $R_f$ is a perfluorinated linear or branched aliphatic group containing 1-20, preferably 1-10, and most preferably 1-4 carbon atoms and n is an integer between 1 and 4. Specific examples include, but are not limited to perfluoro(propoxyallyl ether) and perfluoro(propoxybutenyl ether).

Perfluoro(alkoxy alkenyl ethers) differ from perfluoro (alkyl alkenyl ethers) in that $R_f$ in formula VI contains at least one oxygen atom in the aliphatic chain. A specific example includes, but is not limited to perfluoro(methoxyethoxyallyl ether).

Peroxide curable fluoroelastomers that may be employed as the first and second fluoroelastomers of the present invention also contain cure sites of bromine atoms, iodine atoms or both. The cure sites may be along the fluoroelastomer chain (i.e. due to copolymerized units of cure site monomer containing bromine or iodine atoms), at chain ends (i.e. due to polymerization in the presence of an iodine or bromine atom-containing chain transfer agent), or both along fluoroelastomer chains and at chain ends.

Brominated cure site monomers may contain other halogens, preferably fluorine. Examples of brominated olefin cure site monomers are $CF_2=CFOCF_2CF_2CF_2OCF_2CF_2Br$; bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated vinyl ether cure site monomers useful in the invention include 2-bromo-perfluoroethyl perfluorovinyl ether and fluorinated compounds of the class $CF_2Br-R_f-O-CF=CF_2$ ($R_f$ is a perfluoroalkylene group), such as $CF_2BrCF_2O-CF=CF_2$, and fluorovinyl ethers of the class $ROCF=CFBr$ or $ROCBr=CF_2$ (where R is a lower alkyl group or fluoroalkyl group) such as $CH_3OCF=CFBr$ or $CF_3CH_2OCF=CFBr$.

Suitable iodinated cure site monomers include iodinated olefins of the formula: $CHR=CH-Z-CH_2CHR-I$, wherein R is $-H$ or $-CH_3$; Z is a $C_1-C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_nCF=CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodoperfluoroethyl perfluorovinyl ether are also useful cure site monomers.

Units of cure site monomer, when present in the first or second fluoroelastomers employed in this invention, are typically present at a level of 0.05-10 wt. % (based on the total weight of fluoroelastomer), preferably 0.05-5 wt. % and most preferably between 0.05 and 3 wt. %.

Additionally or in place of copolymerized cure site monomer, iodine-containing endgroups, bromine-containing endgroups or mixtures thereof may optionally be present at one or both of the fluoroelastomer polymer chain ends as a result of the use of chain transfer or molecular weight regulating agents during preparation of the fluoroelastomers. The amount of chain transfer agent, when employed, is calculated to result in an iodine or bromine level in the first or second fluoroelastomer in the range of 0.005-5 wt. %, preferably 0.05-3 wt. %.

Examples of chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Also included are the cyano-iodine chain transfer agents disclosed European Patent 0868447A1. Particularly preferred are diiodinated chain transfer agents.

Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Two preferred fluoroelastomers that may be employed in this invention comprise copolymerized units of A) vinylidene fluoride, hexafluoropropylene and, optionally, tetrafluoroethylene and B) vinylidene fluoride, perfluoro(methyl vinyl ether) and tetrafluoroethylene. In the case of the first and second fluoroelastomers, each also contain cure sites of bromine atoms, iodine atoms, or both bromine and iodine atoms. The third fluoroelastomer employed in the compositions of the invention does not contain reactive sites suitable for a peroxide cure, e.g. no bromine or iodine atoms, and is thus not peroxide curable.

Organic peroxides suitable to make the dynamically cured fluoroelastomer gel particles or to cure the overall curable fluoroelastomer composition include, but are not limited to 1,1-bis(t-butylperoxy)-3,5,5-trimethylcyclohexane; 1,1-bis(t-butylperoxy)cyclohexane; 2,2-bis(t-butylperoxy)octane; n-butyl-4,4-bis(t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; alpha, alpha'-bis(t-butylperoxy-m-isopropyl)benzene; 2,5-dimethyl-2,5-di(t-butylperoxy)hexane; 2,5-dimethyl-2,5-di(t-butylperoxy)hexene-3; benzoyl peroxide, t-butylperoxybenzene; 2,5-dimethyl-2,5-di(benzoylperoxy)-hexane; t-butylperoxymaleic acid; and t-butylperoxyisopropylcarbonate. Preferred examples of organic peroxides include 2,5-dimethyl-2,5-di(t-butylperoxy)hexane, dicumyl peroxide, and alpha, alpha'-bis(t-butylperoxy-m-isopropyl)benzene.

Multifunctional unsaturated coagents that may be employed to make the dynamically cured fluoroelastomer gel particles or to cure the overall curable fluoroelastomer composition are polyfunctional unsaturated compounds such as triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, bis-olefins and N,N-diallylacrylamide.

Curable compositions of the invention are made by combining i) the first fluoroelastomer, ii) blend of cured second fluoroelastomer particles in third fluoroelastomer, iii) organic peroxide, and iv) coagent by means of an internal mixer, extruder, or rubber mill, operating at a temperature below the temperature where the organic peroxide decomposes. The resulting composition may then be shaped (e.g. molded or extruded) and cured to form cured fluoroelastomer articles. Curing typically takes place at about 150°-200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded fluororubber component is heated in an oven or the like for an additional period of about 1-48 hours, typically from about 180°-275° C., generally in an air atmosphere.

Cured articles (e.g. seals, hoses, diaphragms, etc.) of the invention are useful in may end use applications, especially in applications where they will be exposed to reactive plasma such as seals in semiconductor manufacturing equipment.

EXAMPLES

Test Methods

Tensile Properties

The following physical property parameters were recorded; test methods are in parentheses:

$T_b$: tensile strength, MPa (ASTM D412-92)
$E_b$: elongation at break, % (ASTM D412-92)
M100: modulus at 100% elongation, MPa (ASTM D412-92)
Hardness, Shore A (ASTM D412-92)
Compression Set B (ASTM D395)
Mooney Scorch (ASTM D1646)

Curing Characteristics

Moving Disc Rheometer (MDR) (ASTM D5289)

The invention is further illustrated by, but is not limited to, the following examples.

Example 1

A blend of gel particles dispersed in an uncured fluoroelastomer was made by combining i) 80 parts by weight of a peroxide curable fluoroelastomer (FKM1) comprising copolymerized units of vinylidene fluoride ($VF_2$), hexafluoropropylene (HFP) and tetrafluoroethylene (TFE) and containing iodine cure sites, ii) 20 parts by weight of a fluoroelastomer (FKM2) comprising copolymerized units of $VF_2$ and HFP (no iodine or bromine atom cure sites), iii) 1.75 parts by weight triallyl isocyanurate coagent (Diak 7 available from DuPont Performance Elastomers) and iv) 1.75 parts by weight organic peroxide (Varox® DBPH available from available from R.T. Vanderbilt) in a Banbury® internal mixer at 160° C. for 45 minutes.

A curable composition of the invention that contained the gel blend prepared above (Sample 1) and a similar control composition without gel particles (Control A) were mixed on a two roll rubber mill at room temperature so as not to decompose the organic peroxide and cause premature curing. The formulations are shown in Table I. Amounts are parts by weight.

Curing characteristics and physical properties were measured according to the Test methods. Results are also shown in Table I. Sample 1 of the invention (contained gel) had a better (i.e. higher) tensile strength (Tb) and better (i.e. lower) compression set than that of the control composition (no gel). Sample 1 also cured faster (i.e. lower t'90) than did the control composition. In addition, Sample 1 had a higher viscosity (ML from the MDR test) than did Control A which results in improved backpressure in an O-ring compression molding process.

TABLE I

| Ingredient | Control A | Sample 1 |
|---|---|---|
| FKM1 | 100 | 75 |
| Diak 7 | 1.5 | 1.5 |
| Varox ® DBPH liquid | 1.75 | 1.5 |
| Gel Blend | 0 | 25 |
| Mooney Scorch @121° C. | | |
| 2 pt. rise (minutes) | 29.7 | 18.7 |
| MDR @165° C., 0.5° arc, 12 minutes | | |
| ML (dN · m) | 1.1 | 1.7 |
| MH (dN · m) | 10.9 | 11.8 |
| Ts2 (minutes) | 1.6 | 1.0 |
| T'90 (minutes) | 6.6 | 4.1 |
| Physical Properties @25° C., 214 O-rings, 7 minute press cure 162° C., 4 hour post cure @160° C. | | |
| M100, MPa | 1.1 | 1.1 |
| Tb, MPa | 3.9 | 7.6 |
| Eb, % | 376 | 383 |
| Compression Set of 214 O-rings cured as above | | |
| 70 hours, 200° C. | 61 | 45 |

Example 2

A blend of gel particles dispersed in an uncured fluoroelastomer was made by combining i) 80 parts by weight of a peroxide curable fluoroelastomer (FKM1) comprising copolymerized units of vinylidene fluoride (VF$_2$), hexafluoropropylene (HFP) and tetrafluoroethylene (TFE) and containing iodine cure sites, ii) 20 parts by weight of a fluoroelastomer (FKM2) comprising copolymerized units of VF$_2$ and HFP (no iodine or bromine atom cure sites), iii) 9 parts by weight triallyl isocyanurate coagent (Diak 7 available from DuPont Performance Elastomers) and iv) 3 parts by weight organic peroxide (Varox® DBPH available from available from R.T. Vanderbilt) in a Banbury® internal mixer at 160° C. for 45 minutes.

A curable composition of the invention that contained the gel blend prepared above (Sample 2) and a similar control composition without gel particles (Control B) were mixed on a two roll rubber mill at room temperature so as not to decompose the organic peroxide and cause premature curing. The formulations are shown in Table II. Amounts are parts by weight. It only took 15 minutes to mix the composition of the invention (Sample 2), whereas it took 45 minutes to mix the control composition without gel (Control B).

Curing characteristics and physical properties were measured according to the Test methods. Results are also shown in Table II. Sample 2 of the invention (contained gel) had a better (i.e. higher) tensile strength (Tb) than that of the control composition (no gel). Sample 2 also cured faster (i.e. lower t'90) than did the control composition.

TABLE II

| Ingredient | Control B | Sample 2 |
|---|---|---|
| FKM1 | 97.75 | 77.75 |
| Diak 7 | 3 | 3 |
| Varox ® DBPH liquid | 1.25 | 1.25 |
| Gel Blend | 0 | 20 |
| Mooney Scorch @121° C. | | |
| 2 pt. rise (minutes) | >30 | 13.8 |
| MDR @165° C., 0.5° arc, 12 minutes | | |
| ML (dN · m) | 1.0 | 1.8 |
| MH (dN · m) | 13.5 | 14.5 |
| Ts2 (minutes) | 1.2 | 0.8 |
| T'90 (minutes) | 6.3 | 2.8 |
| Physical Properties @25° C., 214 O-rings, 10 minute press cure 177° C., 4 hour post cure @160° C. | | |
| M100, MPa | 1.1 | 1.3 |
| Tb, MPa | 7.2 | 10.2 |
| Eb, % | 374 | 336 |
| Compression Set of 214 O-rings cured as above | | |
| 70 hours, 200° C. | 29 | 30 |

What is claimed is:

1. A process for the manufacture of a curable composition comprising a peroxide curable first fluoroelastomer, dynamically cured gel particles of a second fluoroelastomer and an uncured third fluoroelastomer, said process comprising:
    A) forming a blend of dynamically cured gel particles of said second fluoroelastomer dispersed in said uncured third fluoroelastomer by introducing uncured second fluoroelastomer, uncured third fluoroelastomer, organic peroxide and multifunctional unsaturated coagent into an internal mixer or extruder and dynamically curing said second fluoroelastomer at a temperature above the decomposition temperature of the organic peroxide; and
    B) combining said blend of dynamically cured gel particles of said second fluoroelastomer dispersed in said uncured third fluoroelastomer with said first fluoroelastomer, organic peroxide and multifunctional unsaturated coagent, at a temperature below the decomposition temperature of the organic peroxide, to form a curable fluoroelastomer composition comprising i) 55 to 95 weight percent, based on total weight of all fluoroelastomers in said composition, of a first curable fluoroelastomer comprising copolymerized units of vinylidene fluoride and at least one other fluoromonomer, said first fluoroelastomer having cure sites selected from the group consisting of iodine atoms, bromine atoms, and the combination of iodine and bromine atoms; ii) 5 to 45 weight percent, based on total weight of all fluoroelastomers in said composition, of a blend comprising a) 55 to 95 weight percent, based on total weight of said blend, of cured gel particles of a second fluoroelastomer comprising copolymerized units of vinylidene fluoride and at least one other fluoromonomer, said second fluoroelastomer having cure sites selected from the group consisting of iodine atoms, bromine atoms, and the combination of iodine and bromine atoms; and b) 5 to 45 weight percent, based on total weight of said blend, of an uncured third fluoroelastomer comprising copolymerized units of vinylidene fluoride and at least one other fluoromonomer, said third fluoroelastomer having no bromine or iodine cure sites; iii) less than 1 weight percent, based on total weight of said curable composition, of filler; iv) 0.1 to 6 parts by weight organic peroxide per hundred parts by weight of said first curable fluoroelastomer; and v) 0.1 to 10 parts by weight multifunctional unsaturated coagent per hundred parts by weight of said first curable fluoroelastomer.

2. A process of claim 1 wherein said first fluoroelastomer comprises copolymerized units selected from the groups consisting of i) vinylidene fluoride, hexafluoropropylene and optionally tetrafluoroethylene, and ii) vinylidene fluoride, perfluoro(methyl vinyl ether) and tetrafluoroethylene.

3. A process of claim 2 wherein said first fluoroelastomer further comprises copolymerized units of a cure site monomer selected from the group consisting of iodine-containing cure site monomers, bromine-containing cure site monomers, and mixtures thereof.

4. A process of claim 2 wherein said first fluoroelastomer further comprises cure sites selected from the group consisting of iodine-containing endgroups and bromine-containing endgroups.

5. A process of claim 1 wherein said second fluoroelastomer comprises copolymerized units selected from the group consisting of i) vinylidene fluoride, hexafluoropropylene and optionally tetrafluoroethylene, and ii) vinylidene fluoride, perfluoro(methyl vinyl ether) and tetrafluoroethylene.

6. A process of claim 5 wherein said second fluoroelastomer further comprises copolymerized units of a cure site monomer selected from the group consisting of iodine-containing cure site monomers, bromine-containing cure site monomers, and mixtures thereof.

7. A process of claim 5 wherein said second fluoroelastomer further comprises cure sites selected from the group consisting of iodine-containing endgroups and bromine-containing endgroups.

8. A process of claim 1 wherein said first fluoroelastomer and said second fluoroelastomer are the same fluoroelastomer.

9. A process of claim 1 wherein said third fluoroelastomer comprises copolymerized units selected from the group consisting of i) vinylidene fluoride, hexafluoropropylene and optionally tetrafluoroethylene, and ii) vinylidene fluoride, perfluoro(methyl vinyl ether) and tetrafluoroethylene.

* * * * *